Sept. 9, 1969  G. F. DODGE III  3,465,535

FROST DETECTOR FOR REFRIGERANT EVAPORATORS

Filed May 1, 1968

INVENTOR.
GERALD F. DODGE III

BY *Walter E. Rule*

HIS ATTORNEY

United States Patent Office 3,465,535
Patented Sept. 9, 1969

3,465,535
FROST DETECTOR FOR REFRIGERANT EVAPORATORS
Gerald F. Dodge III, Louisville, Ky., assignor to General Electric Company, a corporation of New York
Filed May 1, 1968, Ser. No. 725,863
Int. Cl. F25d 21/02, 21/06
U.S. Cl. 62—151                                              2 Claims

ABSTRACT OF THE DISCLOSURE

A frost detector for detecting the accumulation of frost on a refrigerant evaporator includes a vibration transmitting wire spaced from the surface of the evaporator and means for transmitting vibrations through the wire. A change in the transmitted vibration caused by contact of frost with the wire is used to signal the need for defrosting for the evaporator.

Background of the invention

Figure 1:
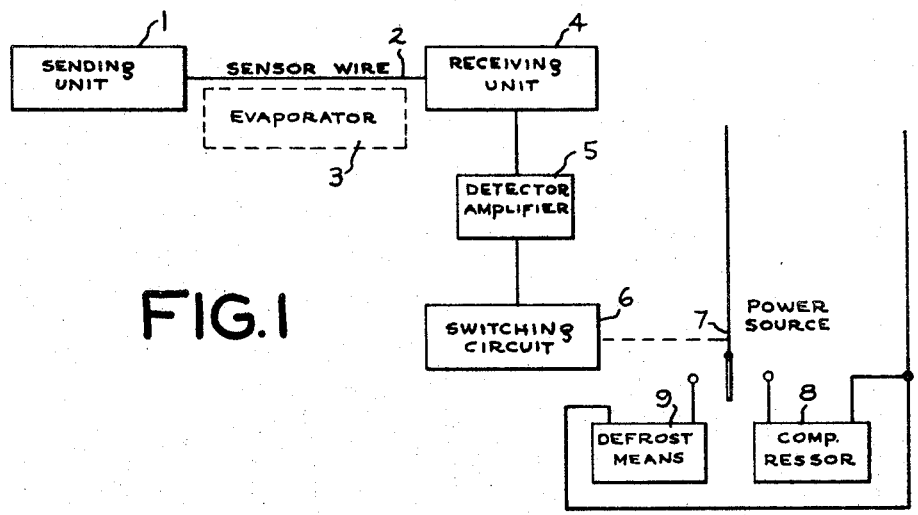

Numerous means have been used or proposed for sensing the accumulation of frost on an evaporator operating at below freezing temperatures. Most of the frost detectors have been of the "spot checking" type in that they measured or were responsive to the accumulation of frost on a specific area of the evaporator. Thus they did not accurately reflect or indicate the overall condition of the evaporator with the result that the evaporator controlled thereby would be defrosted too frequently or not frequently enough depending upon the specific location of the frost sensing means. A second type of frost detector responsive to a change in the velocity or pressure of air circulated through or over the evaporator have been used or proposed as means for sensing more accurately the overall frost condition on the evaporator. However, in the operation of some evaporators, frost tends to migrate to the colder portion of the evaporator leaving the remaining surfaces substantially frost free. As a result, the collection of an abnormal amount of frost or ice on the colder portion of the evaporator may require a defrosting of the evaporator even though there has not been a substantial change in the air flow over the evaporator.

One type of detector means generally used for detecting the accumulation of ice, as distinguished from the lighter, fluffier frost accumulating on the usual household evaporator surfaces, comprises a vibratory resonant member and means responsive to a change in the vibrations of the member for indicating the accumulation of ice. However, such detectors, described for example in Patent 3,240,054 Roth, are also of the "spot checking" type in that the vibrating member has been a diaphragm or relatively short rod or tube restricted to a specific sensing area limited to the dimensions of the member.

Summary of the invention

The present invention is directed to an improved frost detector of the vibrational type and including a vibrating member in the form of a wire which is positioned in spaced relationship with a substantial area of the defrosting evaporator, for example the entire length or width of the evaporator, so that it can sense the accumulation of frost at any portion of a relatively large sensing area. More specifically, in accordance with the preferred embodiment of the invention, there is provided a frost detector including a vibration sending unit and a vibration receiving unit interconnected by a length of wire supported in frost sensing spaced relationship across the face of the evaporator which is normally subject to frost build-up. Means responsive to the contact of frost with the wire are provided for initiating defrosting of the evaporator surfaces.

Reference to the drawing

Figure 2:
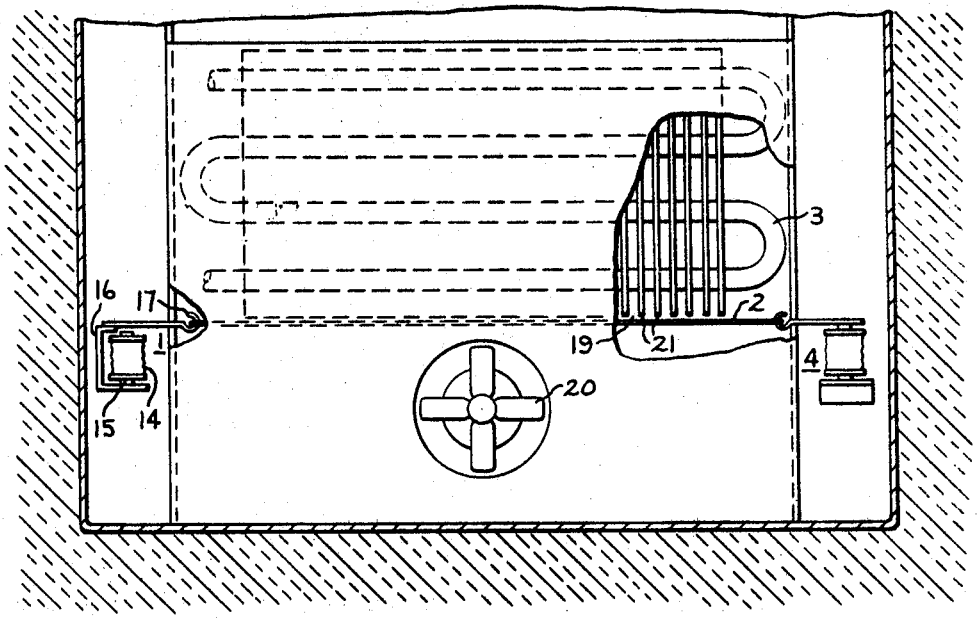

In the accompanying drawing:
FIGURE 1 illustrates one type of circuitry including a vibrating wire for sensing the accumulation of frost on an evaporator and
FIGURE 2 schematically illustrates one application of the frost detecting means to a forced air evaporator.

Description of the preferred embodiment

FIGURE 1 of the accompanying drawing comprises a schematic block diagram of a frost detecting system or means constructed in accordance with the present invention and including a vibration sending unit 1 including an electromechanical transducer for converting electrical energy to vibratory energy and a sensor strand 2 of wire, nylon or similar suitable material positioned in spaced relationship with a surface of an evaporator 3 and connecting the sending unit to a receiving unit 4 which converts the vibratory energy transmitted through the sensor wire 2 to electrical energy. The electrical output of the receiving unit comprises an oscillating electric signal which is transmitted to a detector and amplifier 5 which detects a change in the oscillating electric signal frequency upon contact of frost with the wire 2, amplifies this change and upon the occurrence of such change causes a switching circuit 6 including switch means 7 to deenergize the compressor supplying refrigerant to the evapator 3 and energize a defrost means such as an electric heater 9 to effect defrosting of the evaporator.

The sending unit 1 may take various forms. For example it may include electromagnetic, piezoelectric, magnetostrictive, or other elements for converting electrical energy to vibrating mechanical energy. Likewise the receiving unit 4 may be of any of the usual type for converting vibrating energy to electrical energy.

In the specific application of the invention illustrated in FIGURE 2 of the drawing, the sending unit or transducer 1 includes electromagnetic actuating means comprising a coil 14 and an armature 15. When the coil is supplied with alternating or pulsating current, the armature 15 and a member 16 having means such as a hook 17 at one end thereof for attachment to one end of the sensor wire 2 vibrate at a certain frequency. The other end of the sensor wire 2 is connected to the receiving unit 4 which is designed to operate generally in a manner which is the reverse of the sending unit 1. In other words, it converts the vibratory energy received from the wire to electrical energy.

Also it is shown in FIGURE 2 the sensor wire 2 is under some tension and is held in spaced relationship with the forward edge or face of the evaporator 19 of the evaporator 3. A preferred location for the sensor wire 2 is upstream from the face of the evaporator through which air is circulated by means of the fan 20. The reason is that much of the moisture contained in the circulated air is deposited on the leading edges of the evaporator fins 21 and when this frost builds up to the point where it contacts or encloses the wire 2, it interferes with the vibration of the sensing wire and reduces or eliminates the energy at the receiver 4. By suitable electric circuitry including a detector 5 and a switching circuit 6, a change in the level of energy at the receiver, indicating a need for defrost, operates the switching circuit to initiate a defrost cycle by, for example, energizing suitable defrost means such as an electric heater in heating relationship with the evaporator. Alternatively an indicator lamp can be substituted for the switch 7 to indicate the need for defrost and the defrost operation may be manually controlled.

What I claim as new and desire to secure by Letters Patent of the United States is:

1. A frost detector for detecting the accumulation of frost on a surface of an evaporator during cooling operation of said evaporator comprising:
   sending means for converting electrical energy to vibratory energy;
   receiving means for converting vibratory energy to electrical energy;
   a metal wire connecting said sending and receiving means for conducting vibrations from said sending means to said receiving means;
   said wire being positioned adjacent said evaporator surface so that the build-up of frost on said surface reduces the vibratory energy at said receiver means to thereby cause a reduction in the electrical energy output thereof and means responsive to said reduction in electrical output energy for initiating a defrosting of said evaporator.

2. In combination, a refrigerator including an evaporator subject to frost build-up and a frost detector for detecting the accumulation of frost on a surface of an evaporator during cooling operation of said evaporator comprising:
   said detector comprising a transducer including a metal wire under tension positioned adjacent said surface for contact by a layer of frost build up on said surface,
   means for detecting a change in the frequency of vibrations of said wire occurring upon contact of frost therewith,
   and means for initiating defrosting of said evaporator upon the occurrence of said change.

References Cited

UNITED STATES PATENTS

| | | | |
|---|---|---|---|
| 2,624,180 | 1/1953 | Grimshaw | 62—140 |
| 2,867,092 | 1/1959 | Perry | 62—140 |
| 3,127,486 | 3/1964 | Blumenshine | 62—140 |

MEYER PERLIN, Primary Examiner

U.S. Cl. X.R.

62—140